Nov. 20, 1928.

J. WORMS 1,692,606

CAR TRUCK

Filed Dec. 19, 1927   2 Sheets-Sheet 1

INVENTOR
Jaques Worms
BY
Howson & Howson
ATTORNEYS

Nov. 20, 1928.  
J. WORMS  
CAR TRUCK  
Filed Dec. 19, 1927
1,692,606
2 Sheets-Sheet 2
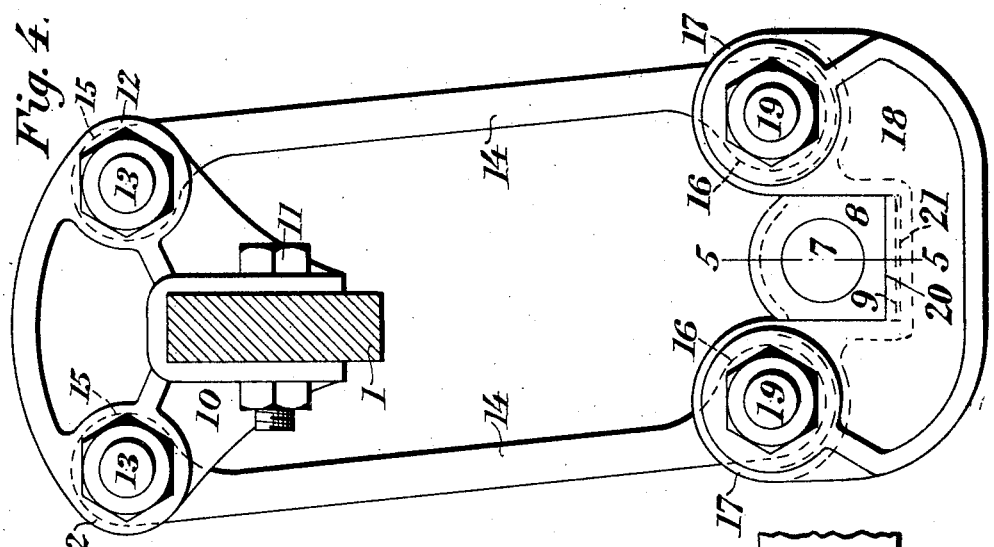
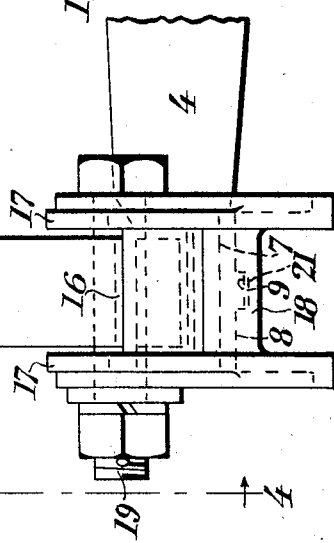
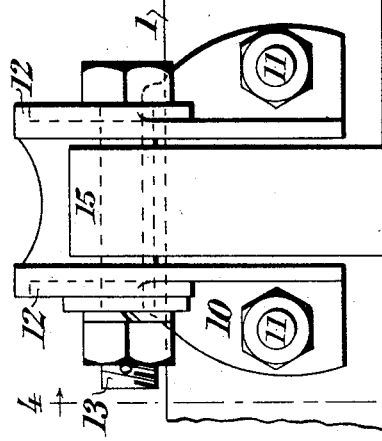
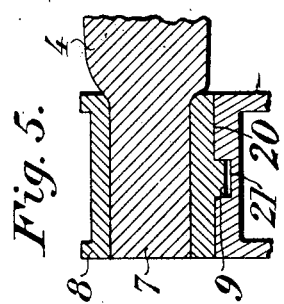
INVENTOR
*Jacques Worms*
BY
*Howson & Howson*
ATTORNEYS Patented Nov. 20, 1928.

1,692,606

UNITED STATES PATENT OFFICE.

JACQUES WORMS, OF PARIS, FRANCE, ASSIGNOR TO THE J. G. BRILL COMPANY, OF PHILADELPHIA, PENNSYLVANIA, A CORPORATION OF PENNSYLVANIA.

CAR TRUCK.

Application filed December 19, 1927, Serial No. 241,036, and in France December 30, 1926.

This invention relates to car trucks and especially to improvements in the suspension of the truck-chassis of the type shown in the Patent #610,119 to G. M. Brill et al., dated August 30, 1898, for pivotal truck, and in the Patent #1,449,935 to J. A. Brooks for car truck, dated March 27, 1923.

One object of the invention is to provide an elastic suspension for car trucks so that the lateral movement which is produced when the vehicle enters a curve will be prevented.

Another object is to provide suspension means for car trucks wherein the weight of the body mounted on the pivot-bolster of the truck will be carried over to the side-bars in the neighborhood of the axle.

Another object is to so construct a car truck that the suspension of the levers from the side-bars of the truck-chassis, in the neighborhood of the pedestals of the journal boxes, is effected by means of a system of parallel links or hangers constituting a changeable parallelogram.

Another object is to produce an efficient, strong and durable car truck which may be economically constructed.

Other objects and advantages will hereinafter appear.

The views of the drawings are:

Fig. 3 is an enlarged elevation of the suspension means shown in Fig. 1;

Fig. 4 is an elevation, partly in section, as seen from the line 4—4 of Fig. 3;

Fig. 5 is a detail vertical section taken on the line 5—5 of Fig. 4 showing the construction of the bearing, and Fig. 6 is a section similar to Fig. 5 showing a modification of the bearing.

Figure 1:
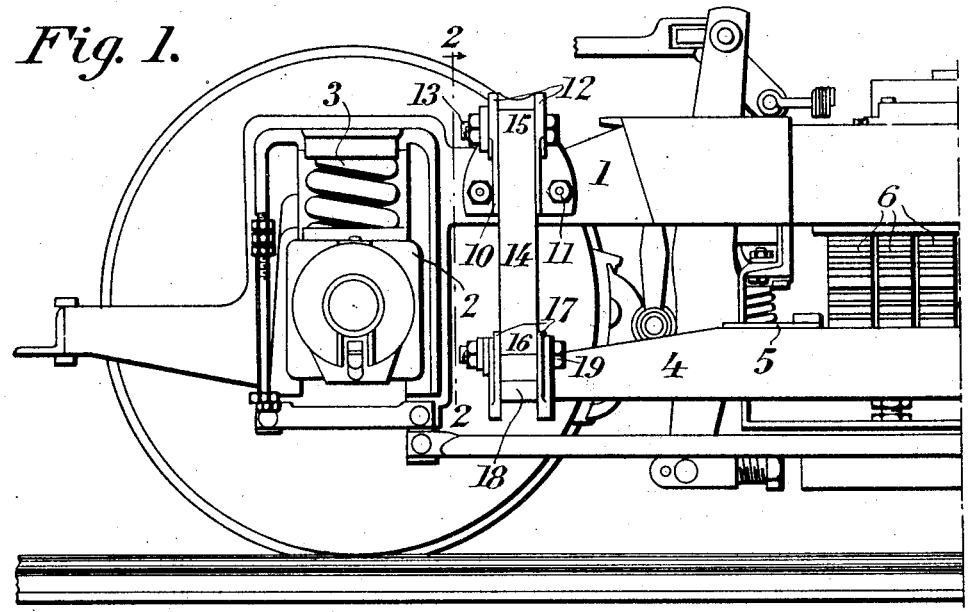
Figure 1 is a side elevation of a portion of a car truck constructed according to the invention.

This invention applies more especially to trucks on which the car chassis rests in a longitudinal direction in the middle of an elastic suspension on journal boxes, and where the weight of the body is carried by sills, which if desired may be in the neighborhood of the axles, due to the use of equalizing bars carrying, by means of truck-bolsters, transverse elliptical springs that support the pivot-bolster of the truck.

This type of truck, which is already old, and has resilient suspension bases having the longest possible dimension, is made especially for loads which are somewhat heavy and wheel-bases which are somewhat long.

On the other hand, the transverse stability of this truck with equalizing bars which are suspended from the side-bars, which should be excellent, in view of the fact that the elliptical springs are carried there by a system resting directly on the side-bars, thus allowing an increase in distance from axis to axis of the elliptical springs, leaves much to be desired.

Indeed, the levers being pinned in eye-bolts, the pivot-bolster of the truck should be able to remain in a horizontal position when transverse displacements of the bolster under the action of centrifugal power in running in curves takes place.

However, the suspension devices of the equalizing bars contain a resilient part, for instance, a helical spring, so that when the truck runs into curves, the hangers located at the outside of the curve have a tendency to increase in length, due to the compression of the spring they contain, whereas the corresponding devices located at the inside of the curve have a tendency to decrease in length, as the spring they contain is then unburdened.

Therefore, the body gets a certain inclination, and shows, when the truck gets back to a tangent, the tendency of inclining toward an inverse direction and making a balancing movement. It is rendered still more difficult to overcome this balancing movement the more, since the equalizing springs contained in the clamps are helical, and therefore have no friction.

This invention is designed to remedy these inconveniences by eliminating any resilient part, spring or anything else, contained in the hangers of the equalizing bars, and by replacing these hangers by a system of parallel links forming a changeable parallelogram. These links are jointed at their ends to the body of the side-bar at one place, and to a seat comprising an element of adjustable height in which the end of the equalizing bar is pinned.

Due to this disposition, the suspension system of the equalizing bars maintains a contant length, which eliminates the causes of the above mentioned balancing.

Moreover, this system of suspension permits all possible transverse displacement of the pivot-bolster, when the vehicle runs into curves, at the same time avoiding transverse oscillations on the tangent.

This result is another advantage of the invention, for the clamp-suspensions with which the transverse displacement of the pivot-bolster is obtained by the swinging of the upper part of the clamp in a rounded field, either on the longitudinal edges of the side-bar, or by the gliding of this part on cylindric expansion of the side-bar, which results either in construction forms that are difficult to realize or in suspensions of too great a mobility or a mobility which is insufficient.

Therefore, the invention consists in combining the following three characteristics in a suspension for car trucks:

1. The body of the chassis rests directly on the journal boxes by means of a resilient suspension.

2. The weight of the body mounted on the pivot-bolster of the truck is carried over to the side-bars in the neighborhood of the axles by means of equalizing bars suspended from the side-bars and carrying elliptical transverse springs supporting the pivot-bolster.

3. The suspension of the levers from the side-bars of the truck-chassis, in the neighborhood of the pedestals of the journal boxes, is effected by means of a system of rods jointed at their upper ends around pins suspended on the side-bar, and at their lower end around pins carried by a seat comprising an element of adjustable height, in which the end of the lever is pinned.

The subject of the invention will be understood more clearly by referring to the accompanying drawings wherein, by way of example, a truck of the type described equipped with the suspension device according to the invention is shown.

The truck has side-bars 1, the ends of which rest on journal boxes 2, being supported thereon by means of a resilient suspension, such for instance, as helical springs 3.

Beneath the side-bars 1 are equalizing bars 4 on which the spring planks 5 of the frame are attached, thus supporting elliptical springs 6 on which the pivot-bolster of the truck is placed in the usual way.

Figure 2:
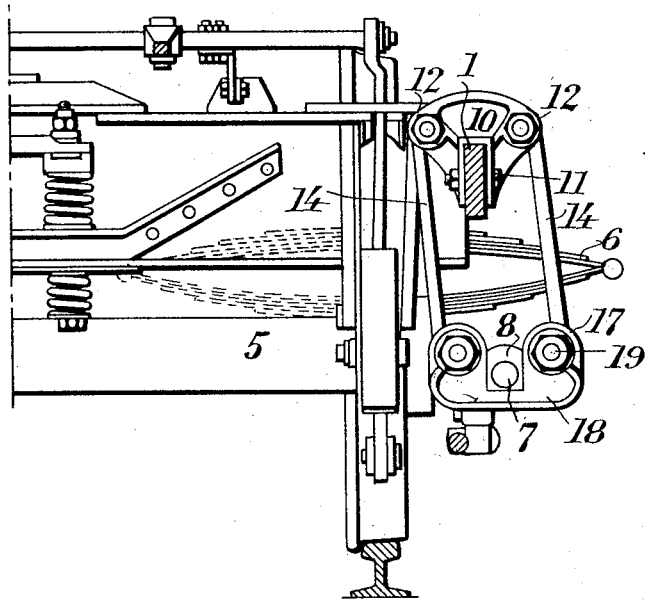
Fig. 2 is a vertical transverse section as seen from the line 2—2 of Fig. 1.

As shown, in Figs. 1 and 2, the springs 6 are disposed transversely of the truck, being located beneath the side-bars 1, and above the equalizing bars 4.

The disposition of the bars 4 with respect to the side-bars 1 is such that the bars 4 are offset slightly from the side-bars, being located further outside the truck than are the side-bars.

The ends 7 of the bars 4 have bearings 8 fixed thereto by any suitable means. The bottom of the bearings have a rib 9 depending therefrom for a purpose to be hereinafter more fully described.

For the purpose of suspending the equalizing bars 4 from the side-bars 1, use is made of brackets 10 which are mounted on the side-bars and fixed thereto by means of bolts 11.

The brackets 10 are so formed as to straddle the side-bars. On each side of the brackets there are laterally disposed pairs of cheeks 12. Each pair of cheeks is provided with alined openings through which pins 13 are passed.

The side-bars have the brackets 10 affixed thereto in such a way that the brackets overlie the ends 7 of the equalizing bars.

Pivoted to the brackets are links or hangers 14. These links have eyes 15 and 16 formed in their ends, the pins 13 being passed through the eyes 15.

The ends of the links 14 having the eyes 16 are positioned between pairs of cheeks 17 of saddles 18, the cheeks 17 being formed with openings through which pins 19 are passed in much the same manner as the pins 13.

In this way, one end of each link is pivoted to the bracket, while the other end of each rod is pivoted to the saddle.

The saddles 18 are adapted to support the ends of the bars 4, and for this purpose, each saddle, intermediate the pairs of cheeks 18, is formed with a recess, providing a seat 20 for the bearing 8.

The seat 20 has a groove 21 formed in its bottom for receiving the rib 9 on the bearings. In this way the ends of the bars 4 will be prevented from being displaced from the saddles, as will be readily understood.

The construction is such that the brackets 10, saddles 18 and links 14 constitute changeable parallelograms, in which the saddles will be free to oscillate about the pivots provided by the pins 13.

In this way means are provided for preventing swinging resulting from the variations of inclination in the curves. The two links 14, swinging around the pins 13 attached on either side of the side-bar, allow the pivot-bolster to shift transversely when the vehicle runs in curves; however, the rods remain in their average position on the tangent.

In order to facilitate the adjusting of the height of the vehicle and to offset the wearing out of the tires of the wheels and of the axle-journal brass parts, the seats 20 may have blocks 23 inserted therein between the bottom of the bearings 8, such blocks having the desired thickness and being formed on one side with a slot 24 for receiving the rib 9 of the bearings, and having a depending rib 25 formed on their opposite sides for meshing with the grooves 21 of the seats 20, (see Fig. 6). It will be understood that it is very easy to insert the blocks 23 in between the bearings 8 and seats 20, in view of the fact that the levers 4 that are accessible from the outside may easily be lifted.

The invention set forth herein is, of course, susceptible of various modifications and adaptations.

The invention claimed is:

1. In combination with a truck frame including side-bars, equalizing rods disposed beneath said side-bars and disposed in offset relation thereto, and means for suspending the levers from the side-bars comprising structure in the form of a changeable parallelogram, one end of which is pivotally connected to said side-bars and the other end of which is pivotally connected to the end of the said rods.

2. In combination with a truck frame including side-bars having their ends resting on journal boxes and supported thereon by an elastic suspension, of means whereby the weight of the body mounted on the pivot-bolster of the truck is carried over to the side-bars, in the neighborhood of the axles, said means including equalizing rods suspended from the side-bars and carrying the supports of transverse elliptical springs maintaining the pivot-bolster.

3. In combination with the side-bars of a truck, equalizing rods disposed beneath said side-bars and disposed in offset relation thereto, a bracket fixed to the side-bars and overlying each end of the said rods, a bearing on each end of the said rods, a saddle having a seat for the said bearing, and means pivotally connected to the said bracket and to the said saddle for suspending the rods from the said side-bars.

4. In combination with the side-bars of a truck, equalizing rods disposed beneath said side-bars and disposed in offset relation thereto, a bracket fixed to the side-bars and overlying each end of the said rods, a bearing on each end of the said rods, a saddle having a seat for the said bearing, means for preventing displacement of the bearing from its seat in the saddle, and means pivotally connected to the said bracket and to the said saddle for suspending the rods from the said side-bars.

5. In combination with the side-bars of a truck equalizing rods disposed beneath said side-bars and disposed in offset relation thereto, a bracket fixed to the side-bars and overlying each end of the said rods, a bearing on each end of the said rods, a saddle having a seat for the said bearing, means for preventing displacement of the bearing from its seat in the saddle, means for adjusting the height of the bearing relative to its position in the said saddle, and means pivotally connected to the said brackets and to the said saddle for suspending the rods from the said side-bars.

JACQUES WORMS.